United States Patent [19]
Hughes et al.

[11] Patent Number: 5,557,268
[45] Date of Patent: Sep. 17, 1996

[54] AUTOMATIC VEHICLE RECOGNITION AND CUSTOMER AUTOMOBILE DIAGNOSTIC SYSTEM

[75] Inventors: Gerard J. Hughes, Washington; Leonard J. Duncan, Bridgewater; David P. Goshorn, Flemington; James P. Stokes, Flemington, all of N.J.

[73] Assignee: Exxon Research and Engineering Company, Florham Park, N.J.

[21] Appl. No.: 393,629

[22] Filed: Feb. 24, 1995

Related U.S. Application Data

[63] Continuation of Ser. No. 991,814, Dec. 16, 1992, abandoned.

[51] Int. Cl.[6] .................................................. G08G 1/01
[52] U.S. Cl. ................ 340/933; 340/938; 364/424.03; 364/424.04
[58] Field of Search ......................... 340/933, 938, 340/943; 364/424.03, 424.04; 345/825.34, 825.54, 439

[56] References Cited

U.S. PATENT DOCUMENTS

| | | | |
|---|---|---|---|
| 4,404,641 | 9/1983 | Bosernik | 364/424.03 |
| 4,532,511 | 7/1985 | Lemelson | 340/933 |
| 5,003,476 | 3/1991 | Abe | 364/424.04 |
| 5,058,044 | 10/1991 | Stewart et al. | 364/424.04 |
| 5,072,380 | 12/1991 | Rendelman | 369/406 |
| 5,196,846 | 3/1993 | Brockelsby et al. | 340/933 |

*Primary Examiner*—John K. Peng
*Assistant Examiner*—Edward Lefkowitz
*Attorney, Agent, or Firm*—Ronald D. Hantman

[57] ABSTRACT

The present invention is a system and method for identifying a vehicle for the purpose of displaying diagnostic information to the driver. Each vehicle includes a transponder that transmits an encoded character sequence that is unique to that vehicle. In this way vehicle diagnostic measurements made at the establishment entrance can be associated with the vehicle, and displayed to the customer when the vehicle is recognized again at a service area.

20 Claims, 12 Drawing Sheets

AUTOMATIC VEHICLE RECOGNITION AND CUSTOMER AUTOMOBILE DIAGNOSTIC SYSTEM

This is a continuation of application Ser. No. 991,814, filed Dec. 16, 1992, now abandoned.

BACKGROUND

The present invention relates to a system and method that automatically recognizes a vehicle, determines if parts of the vehicle are functioning properly, and displays this information to the driver at various positions in the service station. Additionally, other promotional information about the customer or the vehicle can be tracked or displayed.

In this manner, the customer can decide the necessity or frequency of vehicle maintenance, and whether to make purchases based on the promotional information displayed.

SUMMARY OF THE INVENTION

The present invention is a system and method for identifying a vehicle in a prescribed area, diagnosing parts of the vehicle for defects in this area, identifying the vehicle again in another area, and displaying the results of the diagnosis to the driver. The system includes several subsystems: an automatic vehicle recognition subsystem, a vehicle diagnostic subsystem, a display subsystem, and a data processing and control subsystem.

The automatic vehicle recognition subsystem includes an antenna which emits electromagnetic waves at predetermined frequencies. This wave activates a transponder affixed to a vehicle, when it is near the antenna. The transponder emits a modulated electromagnetic wave that is unique to each transponder. The subsystem includes a controller that serves two functions, which may be performed by separate or combined electronic devices. One function is to energize the antenna at the proper frequency and power. The other function is to convert the modulated wave received from the transponder into data which can be transferred to a computer. Additionally, the controller may send information back to the transponder which would be stored for later transmission. Electronic equipment that identifies vehicles is well known in the art (see e.g., U.S. Pat. No. 4,782,342 and U.S. Pat. No. 4,888,474).

The vehicle diagnostic subsystem inspects parts of the vehicle as the vehicle drives over or near it. This subsystem is composed of sensors or sensor assemblies, and associated signal conditioning equipment. These sensors convert mechanical or electrical signals obtained from the vehicle, and communicate these signals to a computer where a diagnosis of the condition of the parts of the vehicle that were examined is made. Sensors that inspect vehicles that drive over or nearby are well known.

The display subsystem displays a greeting to the customer, displays vehicle diagnostic information, and displays promotional information. These displays are visible in ambient sunlight and can be viewed by customers while fueling.

The data processing and control subsystem comprises a network of computer processors that obtain information from the vehicle identification equipment and sensor assemblies, determine where to display the customer greeting, diagnostic, and promotional information, and then generates a presentation for the customer. This subsystem maintains a customer database which allows for tracking the frequency of customer visits and identification of recurring problems with the vehicle.

The method of the present invention allows for automatically identifying and diagnosing a vehicle, and displaying the information to the driver. The method includes the steps for identifying a vehicle as it is being examined for mechanical problems, identifying the driver of the vehicle by examining a database which associates the characters emitted by the vehicle transponder with the driver's name, determining where the vehicle has stopped for fueling or other services, and displaying a greeting, diagnostic information, and promotional information to the customer.

DESCRIPTION OF THE PREFERRED EMBODIMENT

Figure 1:
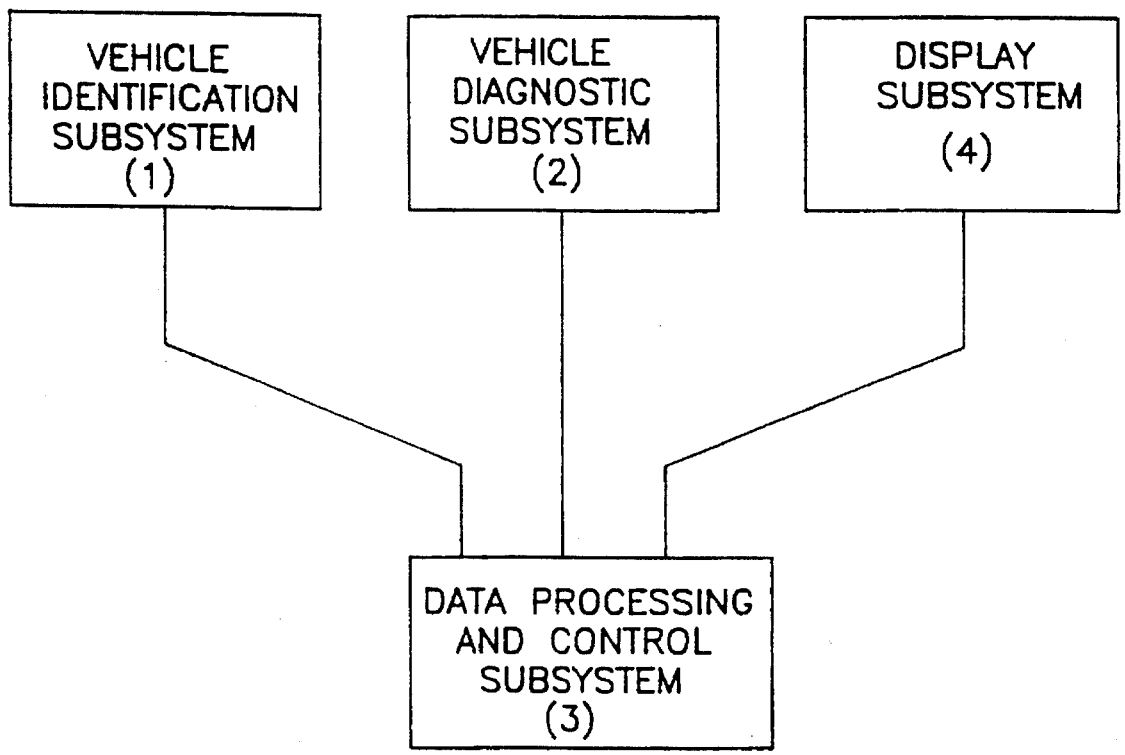
FIG. 1 shows an embodiment of the system.

FIG. 1 shows a schematic diagram of the system. The system includes the following sub-systems: an automatic vehicle recognition subsystem, a data processing and control subsystem, a vehicle diagnostic subsystem, and a customer display subsystem. The automatic vehicle recognition subsystem (1) is used to associate vehicle diagnostic information provided by the vehicle diagnostic subsystem (2) with a particular vehicle, to keep track of the vehicle's position while it moves within the establishment, and to communicate this information to the data processing and control subsystem (3). The data processing and control subsystem analyzes the diagnostic information, associates this information with the vehicle, and composes a graphical or text display sequence, which the customer views on the display subsystem (4).

Figure 1A:
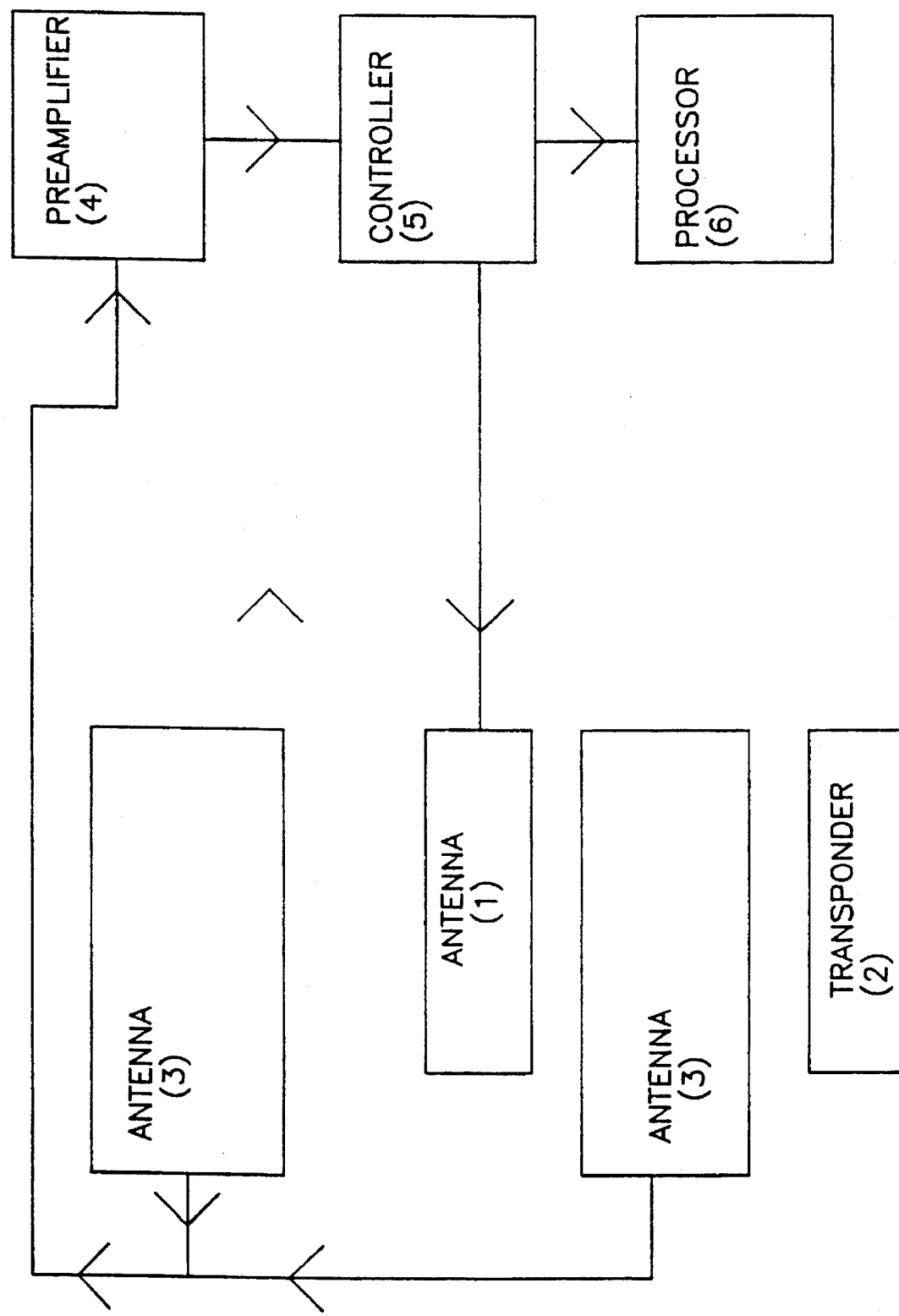
FIG. 1a shows a schematic diagram of the automatic vehicle recognition subsystem.

FIG. 1a shows a schematic diagram of the automatic vehicle recognition subsystem (Box (1) in FIG. 1). The subsystem includes a number of components: an antenna (1) which emits an electromagnetic wave at a predetermined frequency; a transponder (2) which emits a modulated electromagnetic wave on a different frequency when activated by the antenna; an antenna (3) which receives the modulated electromagnetic wave from the transponder, and together with the preamplifier (4) comprise a filter which rejects all signals not on the same frequency as the transponder; the preamplifier, which amplifies the transponder signal, and couples the antenna to the controller (5); the controller, which controls the frequency and energy of the electromagnetic wave emitted by the antenna (1), and converts the modulated electromagnetic wave from the transponder into digital data; and a processor (6) which provides instructions to the controller, and receives data from the controller.

Another embodiment of the system uses a single controller to activate antennas at the entrance and all service areas. When the transponder sends a character sequence that is received by an antenna, the controller records both the character sequence and the antenna at which the sequence was received. The controller then sends this information to the data processing and control subsystem so that it can be associated with vehicle diagnostic information, if the transponder is detected at the entrance, or associated with customer promotional information if the transponder is detected at a service area.

Figure 1B:
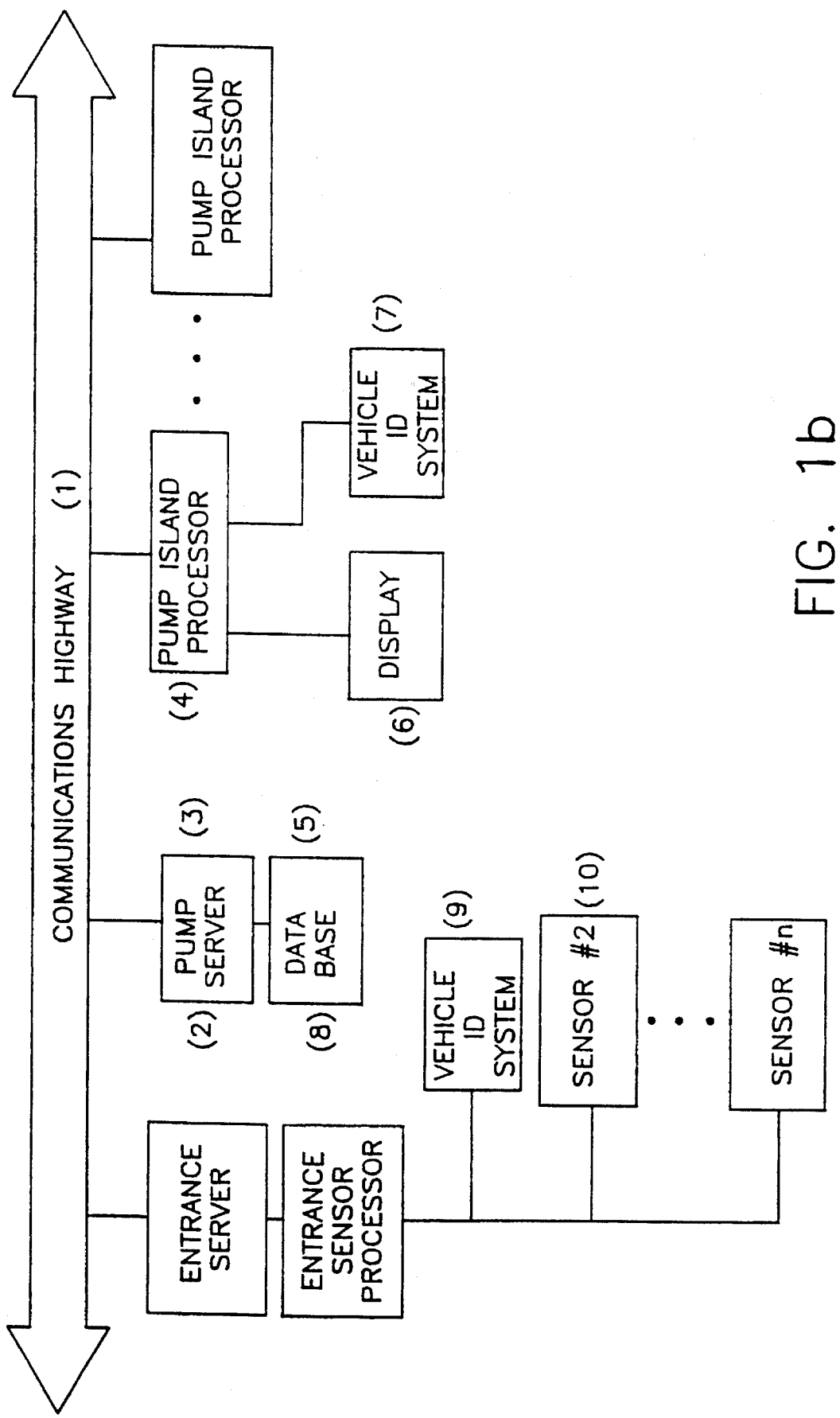
FIG. 1b shows a schematic diagram of the data processing and control subsystem.

FIG. 1b shows a schematic diagram of one embodiment of the data processing and control subsystem (Box (3) in FIG. 1). Component processors of the subsystem communicate with each other via the communications highway (1). These processors can be separate computers or they may be combined into a single unit where the processors communicate over a common bus. The Entrance Sensor Processor (ESP) consists of the following hardware components: a 32 bit single board computer and a number of analog input boards interconnected via a standard bus. There are two software components: a real-time operating system kernel and the applications specific tasks. The entrance sensor processor (8) controls the part of the automatic vehicle recognition subsystem (9) that works in conjunction with the vehicle diagnostic subsystem (10). The vehicle diagnostic subsystem is controlled by the entrance sensor processor. The entrance sensor processor communicates with the entrance server (2), which in turn provides the diagnostic and automatic vehicle recognition information available to the other processors on the local area network. The pump server (3) associates the vehicle recognition and diagnostic information with customer name and preference information in the database (5). The pump server also tracks recognized vehicles within the establishment to determine where they stop for service. The pump island processors (4) control the part of the vehicle recognition subsystem (7) that recognizes the vehicle in the area where customer services are provided. These processors also generate the customer display sequence from the information provided by the pump server, and these processors control the display subsystem (6).

Figure 1C:
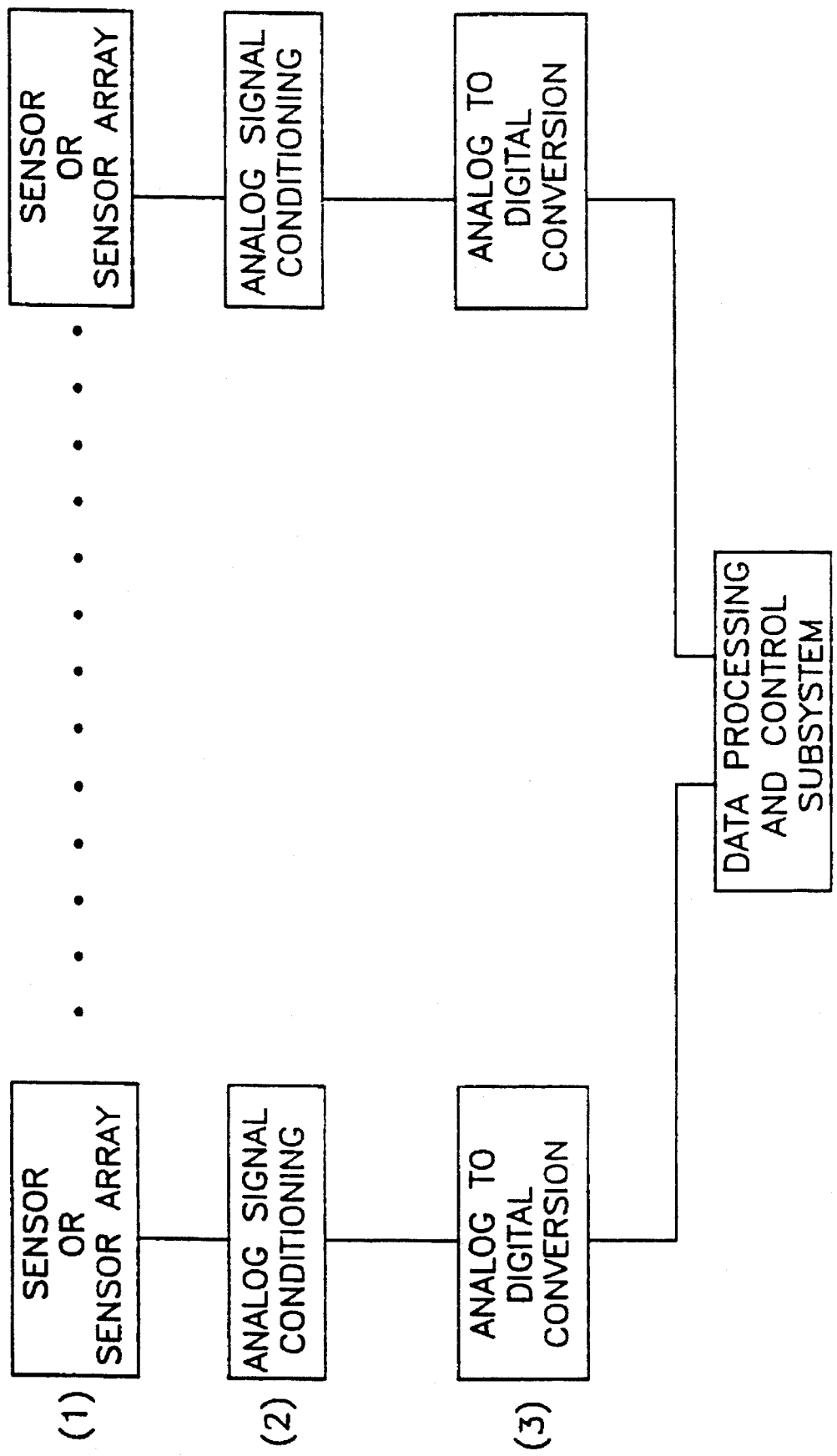
FIG. 1c shows a schematic diagram of the vehicle diagnostic subsystem.

FIG. 1c (Box (2) in FIG. 1) shows a schematic diagram of the components of the embodiment of the vehicle diagnostic subsystem. This subsystem performs a diagnostic procedure such as determining tire pressure. The sensor assemblies (1) contain electrical, acoustic, and mechanical transducers such as load cells, strain gauges, microphones, video cameras, and ultrasonic emitters and receivers. The signals provided by these sensors are amplified and filtered by the signal conditioning electronics (2). The conditioned signals are digitized by the analog to digital converters (3), which can either be part of the data processing and control subsystem or the vehicle diagnostic subsystem. The digitized signals are analyzed for diagnostic information by the data processing and control subsystem. The data processing and control subsystem can control the sensor assemblies and signal conditioning electronics with digital to analog converters.

The display subsystem comprises audio and visual equipment that are controlled by the data processing and control subsystem. The displays include video display terminals, video projection terminals, and printers for providing the customer with a permanent record of the diagnostic test.

Figure 2:
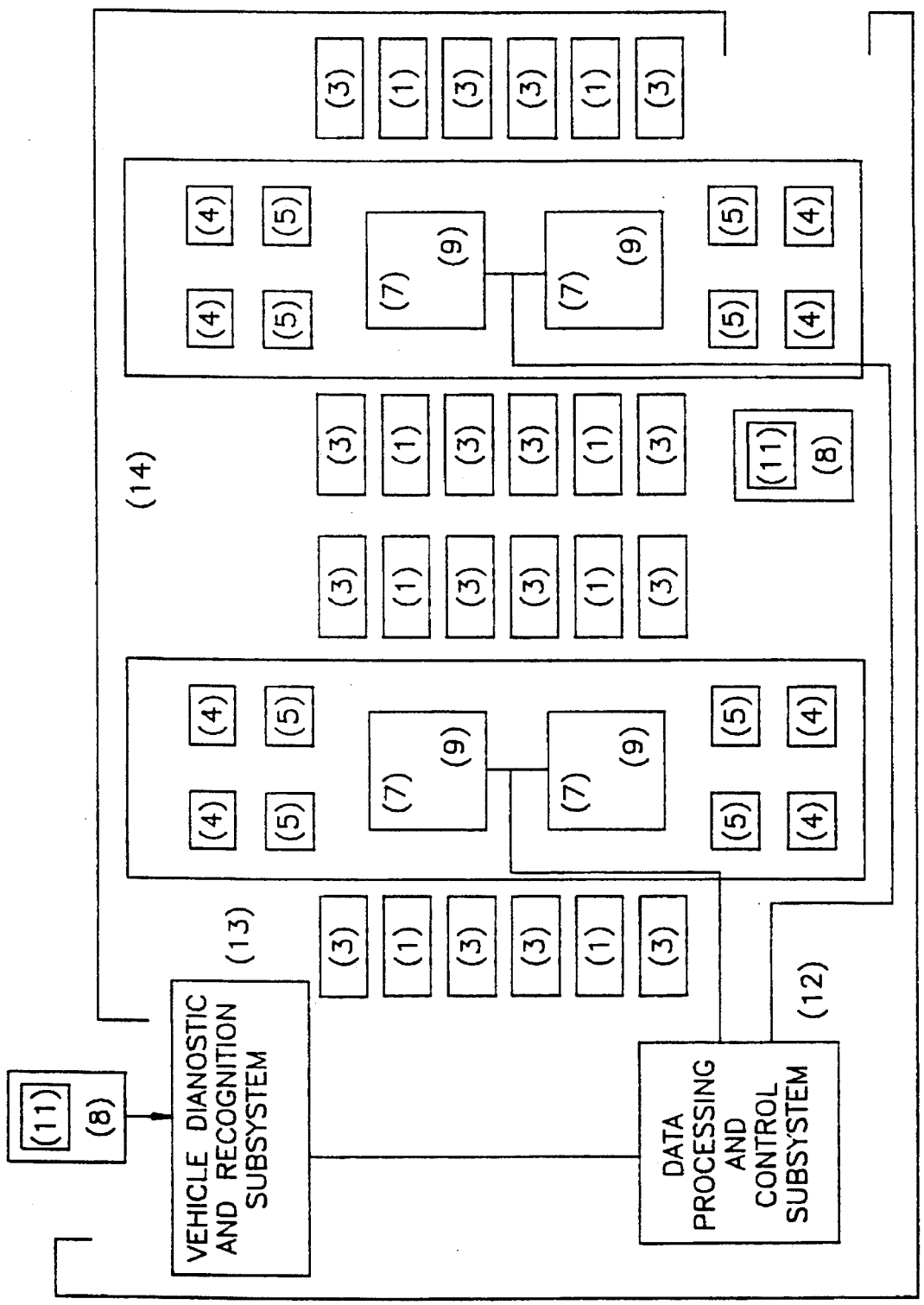
FIG. 2 shows one embodiment of the system.

FIG. 2 shows one configuration of the overall system. The automatic vehicle recognition subsystem is installed at the driveway entrance. These two subsystems are in communication with the data processing and control subsystem. The automobile (8) enters the driveway entrance where it is first recognized and a diagnostic service is performed. For example, the driveway entrance may include appropriate sensors and electronics to measure tire pressure as the automobile drives through. The automatic vehicle recognition subsystem is also installed in the service area for re-recognizing the vehicle, where it communicates with the data processing and control subsystem (12) The service pump area, hereinafter referred to as pump position is used for illustration only, since any service area, such as a vending or convenience store area, car wash area, or the area where compressed air and/or water is provided, can be used for displaying information to the customer. Antenna (1) is located at or near a gasoline dispensing pump. The antenna (1) is energized and produces electromagnetic radiation. The antenna (3) is made in a manner which allows for transponder detection regardless of the direction of vehicle travel. Antenna (1) and antenna (3) can be the same physical device, they can be separate physical devices, or they can be multiple physical devices that are connected together. The electromagnetic radiation produced by the antenna (1) must comply with government regulations regarding power, frequency, and spectral purity.

The transponder (11) is attached to the vehicle (8) and is activated when it is within the "read distance" of antennas (1) and (3). The "read distance" is adjustable so that vehicles at adjacent or nearby fueling positions are not detected. Upon activation, the transponder emits an electromagnetic wave that is modulated in a way that conveys a unique sequence of data to the controller (5). The emitted signal is received by antenna (3), and is filtered and amplified by the preamplifier (4). The processed transponder signal is then passed to the controller (5) for detection and decoding.

The controller detects and decodes the electromagnetic wave, and transfers the decoded digital sequence to the data processing and control subsystem (12), where the data is stored and utilized. Additionally, the processors that comprise this subsystem may instruct the controller to send information to the transponder, which can receive this information while at the fueling position, and save it for later use. Communication from the controller to the transponder can only occur if the transponder is within the "write distance". This distance may be the same as, or different from the "read distance". Furthermore, the controller may send messages to the transponder using antenna (1), antenna (3), or an additional antenna.

The data sequence received from the vehicle transponder is utilized to associate vehicle diagnostic information with a particular customer. In this manner a processor in the data processing and control subsystem can compose a display sequence that includes, but is not limited to, a customer greeting, the results of the vehicle diagnostic tests, and promotional information tailored to the desires of that particular customer. The desired promotional information is stored in the system database and is also associated with the vehicle identification sequence emitted by the transponder.

The customer views the display sequence shown by the display subsystem (7) located at or near the gasoline dispensing pump (9), or in another area where customer service is provided. The display subsystem may also allow for customer input, and in this case customer input will be communicated from the display equipment to the data processing and control subsystem. Additionally, the display subsystem may show information obtained from the gasoline dispensing pump, such as fuel cost per gallon, the rate of fuel dispensing, the total amount of fuel purchased, and the cost of the fuel purchased.

Figure 3:
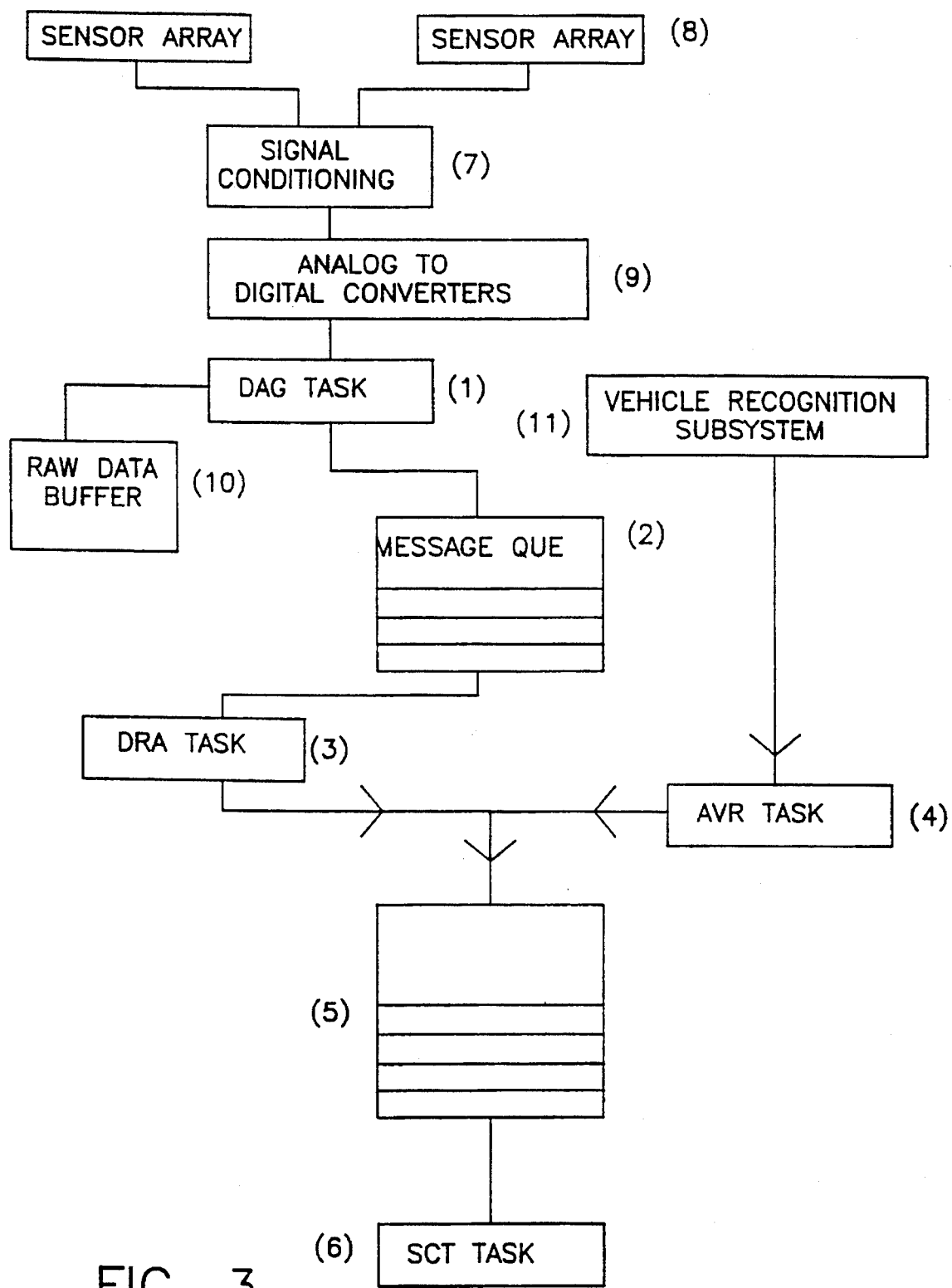
FIG. 3 shows a flow diagram of one method to recognize vehicles at the establishment entrance, and associate this with vehicle diagnostic information.

FIG. 3 shows one embodiment of the method used to acquire data from vehicle diagnostic subsystem and the vehicle identification subsystem using the data processing and control subsystem. When the system is started, the hardware components of the subsystems are reset and a real time kernel is loaded into the entrance sensor processor's memory. This processor is shown as (8) in FIG. 1b. It in turn loads and starts four application tasks.

The Data Acquisition Task (dagq) (1) continuously examines the conditioned signals (7) from the sensor array (8) that are digitized by the analog to digital converters (9), in order to determine if a vehicle has passed over the sensor array. If a vehicle has passed over the array, the task passes the acquired data to a raw data buffer (10). One embodiment of this method uses commercially available analog input devices which contain analog circuitry, analog to digital converters, and internal memory buffers to perform the analog to digital conversion (9). In this embodiment the data acquisition task initializes the analog input devices and starts scanning the current values of the digitized signals from the sensor array for tire traces. When a possible trace is found, the Data Acquisition Task transfers the raw data from the analog input device's memory to an internal raw data buffer (10). It queues a pointer to this buffer in a global message queue (2). It then waits until a raw data buffer is free and restarts the acquisition process.

The Data Reduction and Analysis Task (dra) (3) waits for notification by the kernel that a raw data buffer has been queued. It dequeues the message and extracts the trace data for an axle from the raw data buffer. It then analyses the trace data to produce a set of "parameters" that serve as input to an algorithm that calculates tire pressure. The output is formatted and queued to a second global message queue (5).

The Vehicle Identification Task (avr) (4) initializes the entrance's vehicle identification subsystem (11) and waits until it receives a vehicle identification character string. It validates the character string and queues the vehicle identification information to the second global message queue (5).

The Server Communication Task (sct) (6) waits for notification by the kernel that a message has been queued by either the Data Reduction and Analysis Task or the Vehicle Identification Task. It dequeues the messages and performs the processing necessary to associate an identified vehicle with its diagnostic data. When a valid set of data is assembled, it is formatted and sent as a character string to the Entrance Server shown as (2) in FIG. 1b.

Figure 3A:
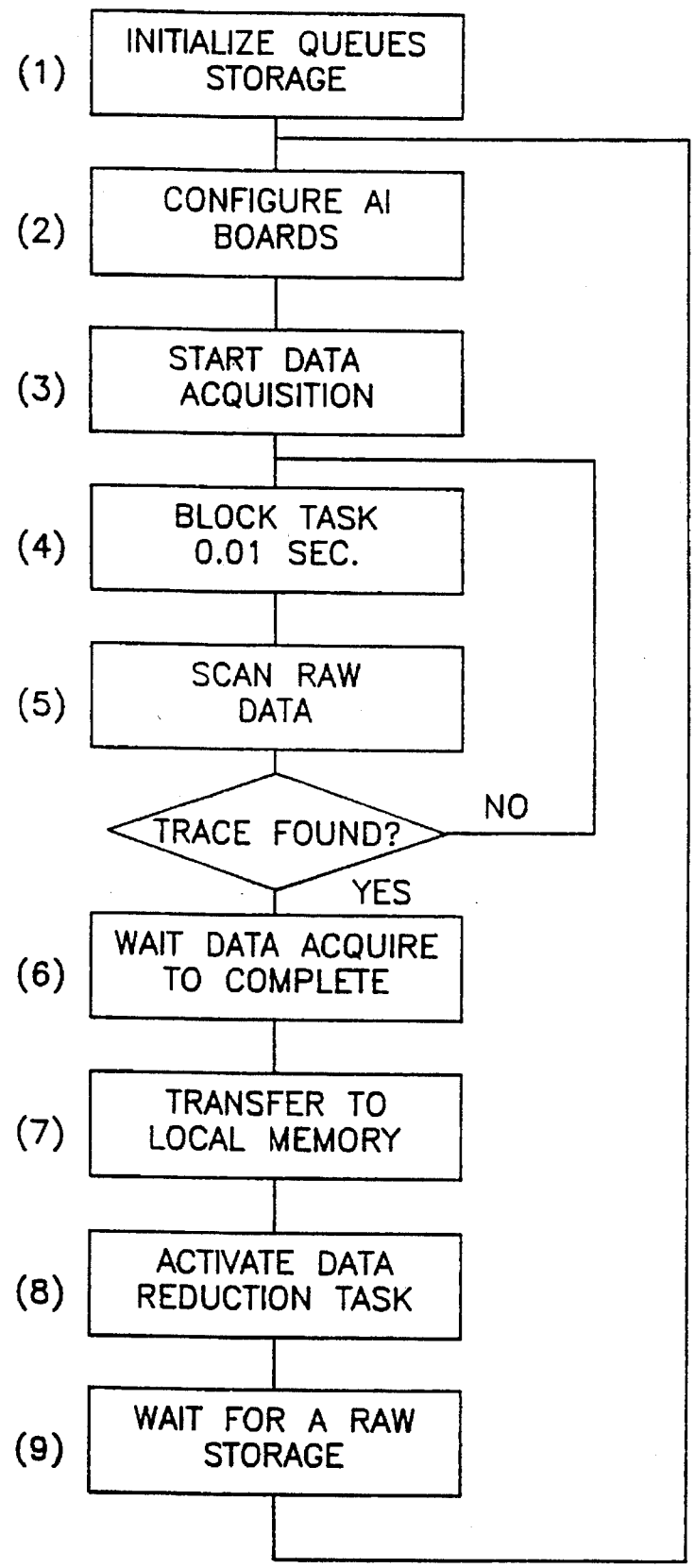
FIG. 3a shows a flow diagram of the vehicle diagnostic task.

The tasks in FIG. 3 are discussed in more detail below. FIG. 3a describes, in more detail, Box (1) in FIG. 3. FIG. 3a shows a method of implementing the Data Acquisition Task. When the task is started (1), it requests the kernel to allocate resources (memory for raw data buffers, message queues and semaphores). It then enters a loop where it sets the configuration parameters on the analog input boards (2) and starts them in a continuous acquisition mode (3). It then blocks and waits for a periodic activation by the kernel (4). Upon activation, it scans the current raw data values to determine if valid diagnostic data are being acquired. If not, it continues to wait. If valid data are available, the task waits for the acquisition to complete (6) and transfers the data from the analog input device's memory to a raw data buffer (7). The task activates the Data Reduction and Analysis Task (8) by queuing a pointer to the raw data buffer (7). It then waits for the kernel to free a raw data buffer (9) and the loop continues.

Figure 3B:
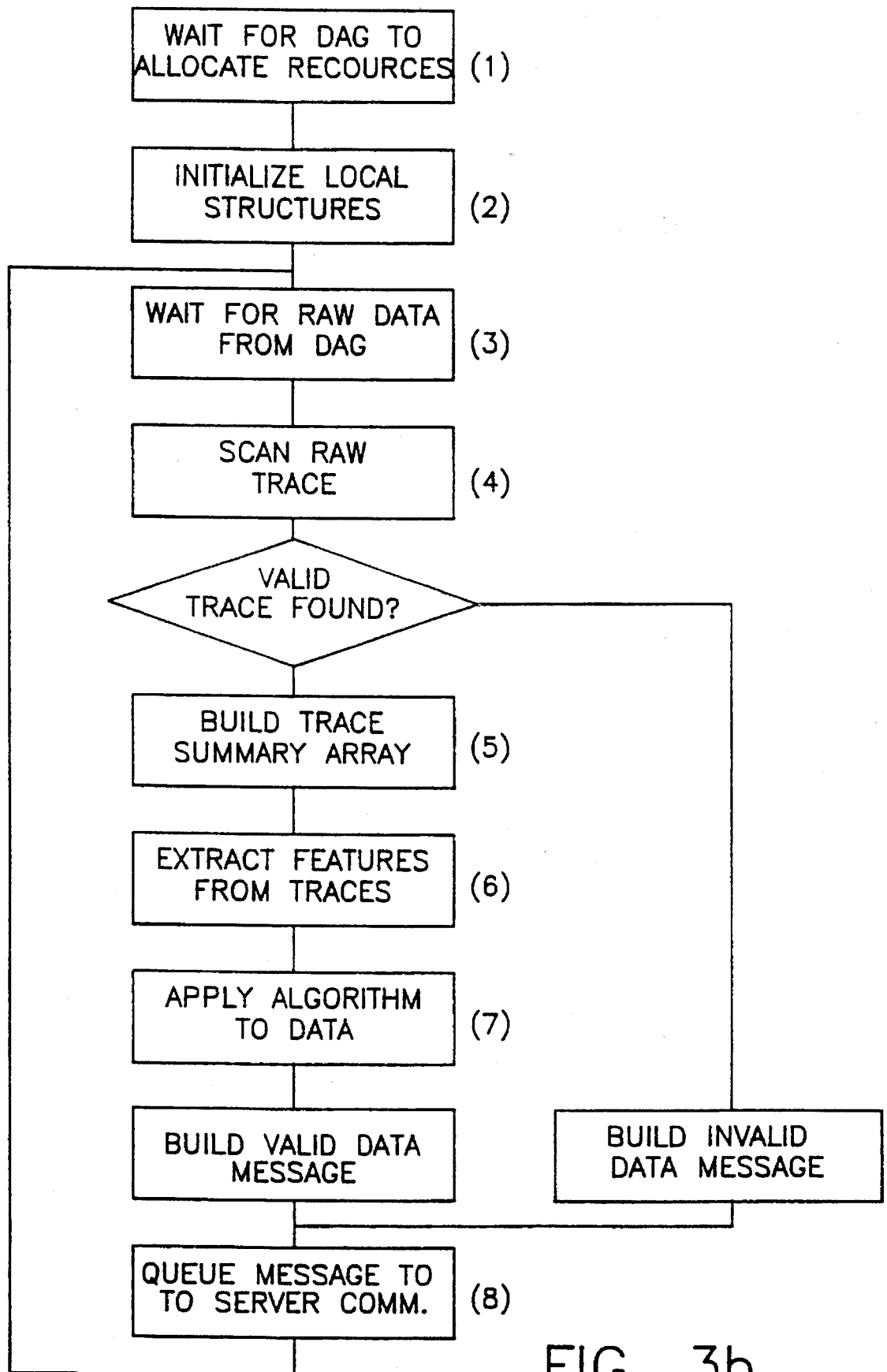
FIG. 3b shows a flow diagram of the data acquisition and analysis task.

FIG. 3b describes, in more detail, Box (3) in FIG. 3. FIG. 3b shows a method for implementing the Data Reduction and Analysis Task. When the task is started, it waits until the kernel has allocated the necessary resources to the Data Acquisition Task (1). It then performs any local initialization (2). The task enters a loop and blocks until notified that a raw data buffer is available for processing (3). The task extracts and validates the diagnostic information from the raw data (4). Steps (5) and (6) further reduce the data into a form that can be processed by an algorithm (7). A message indicating either valid or invalid data is then queued (8) in the message que shown as (5) in FIG. 3 and the loop continues.

Figure 3C:
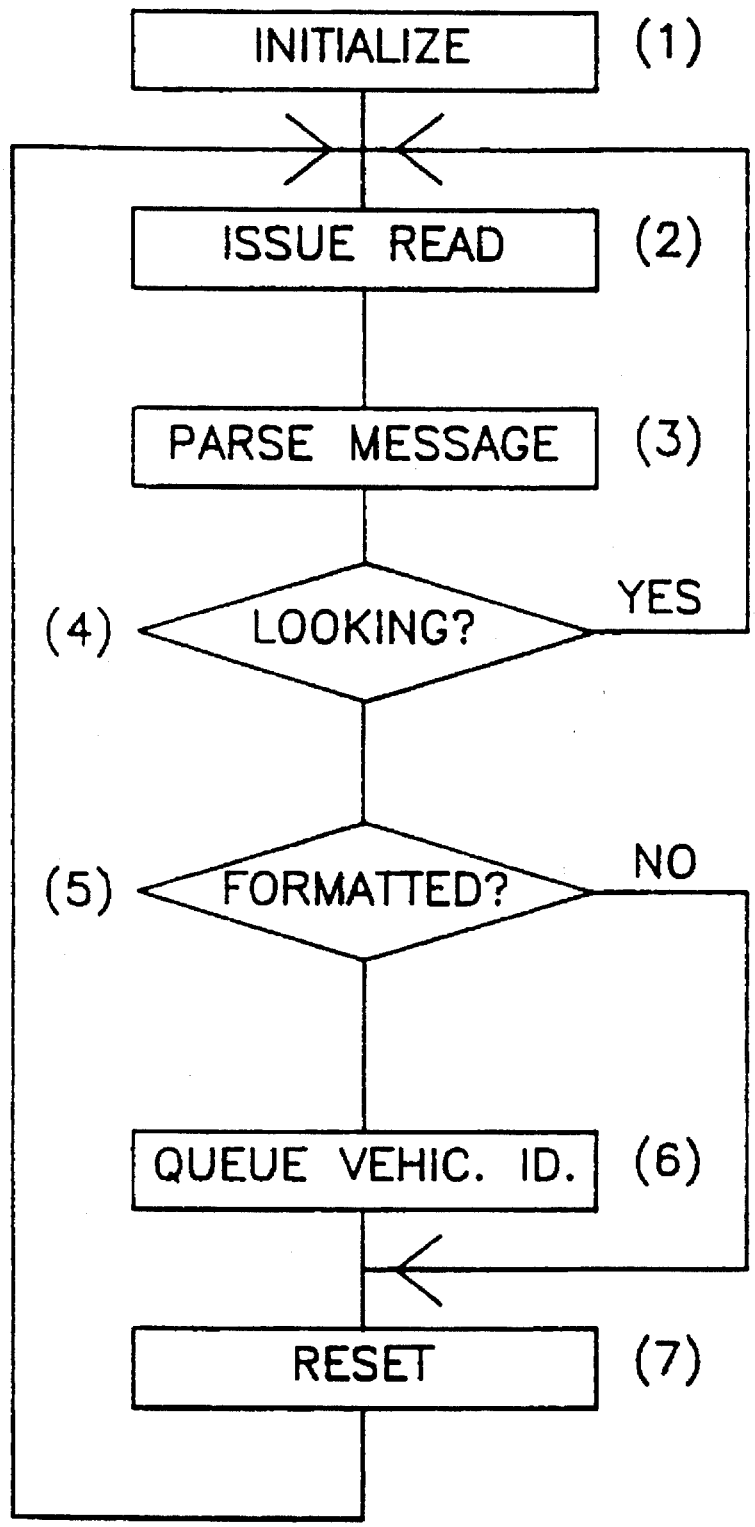
FIG. 3c shows a flow diagram of the vehicle recognition task.

FIG. 3c describes, in more detail, Box (4) in FIG. 3. FIG. 3c shows a method of implementing the Vehicle Identification Task. When the task starts, it initializes local structures (1) and it begins a continuous loop. It issues a read request (2) to the vehicle identification subsystem and blocks until a reply has been received. Upon activation, the task parses the reply (3). If the vehicle identification subsystem is looking (4) for a valid vehicle identification sequence received from a vehicle transponder, the task restarts the loop. If the vehicle identification is not looking for a transponder, the system resets (7), and a new read is issued (2). If the task receives a properly formatted vehicle identification reply (5), it queues the identification character sequence (6) in the message queue stack, shown as (5) in FIG. 3, and restarts the loop (7). If the task does not receive a properly formatted vehicle identification reply, the task immediately resets (7).

Figure 3D:
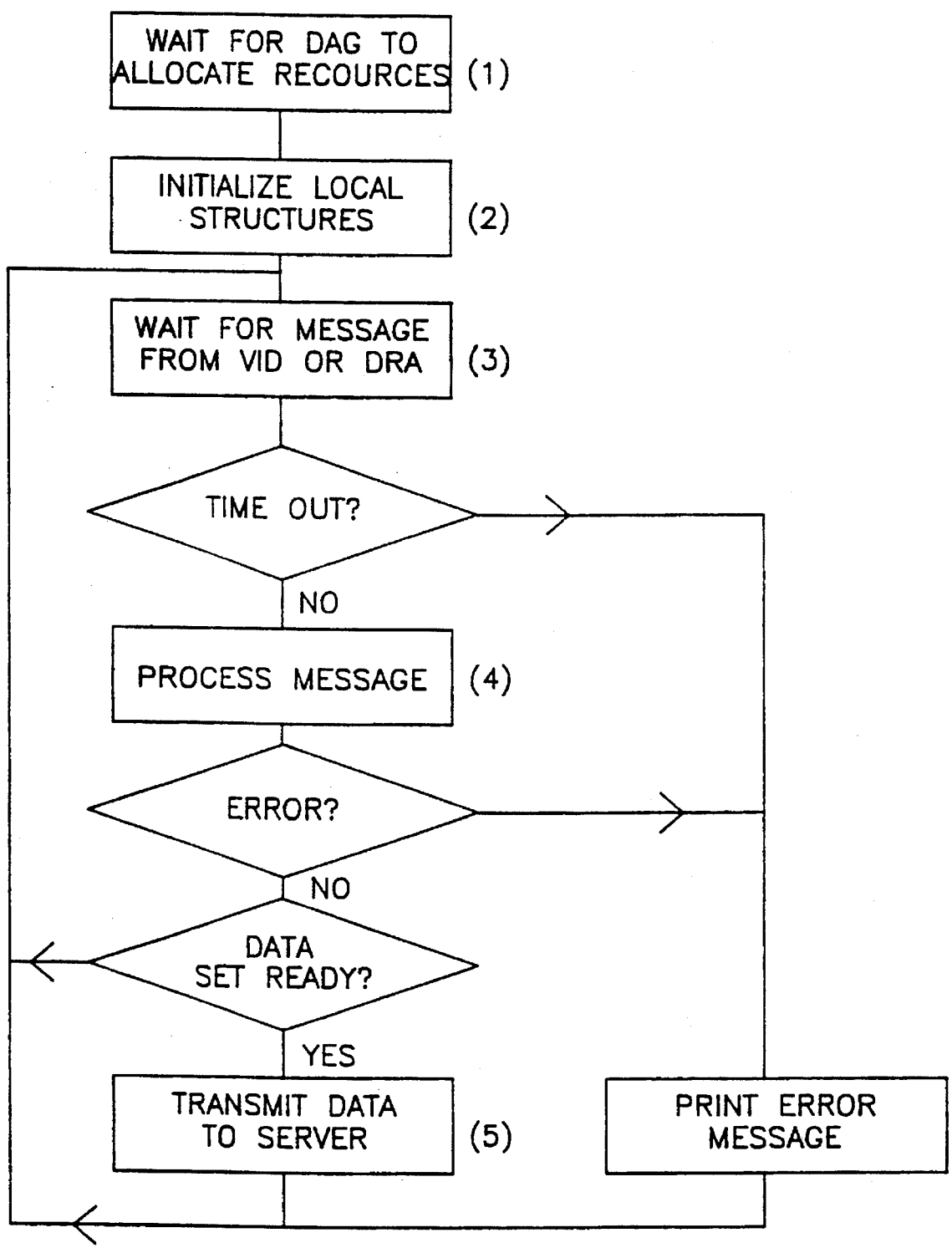
FIG. 3d shows a flow diagram of the data communication task.

FIG. 3d describes, in more detail, Box (6) in FIG. 3. FIG. 3d shows a method of implementing the Server Communications Task. When the task is started, it waits until the kernel has allocated the necessary resources to the Data Acquisition Task (1). It then performs any local initialization (2). The task enters a loop and blocks until notified that either diagnostic data or a vehicle identification sequence is available (3). The task associates the vehicle identification with the diagnostic data (4), formats it into a transaction and transmits it to the Entrance Server.

Figure 3E:
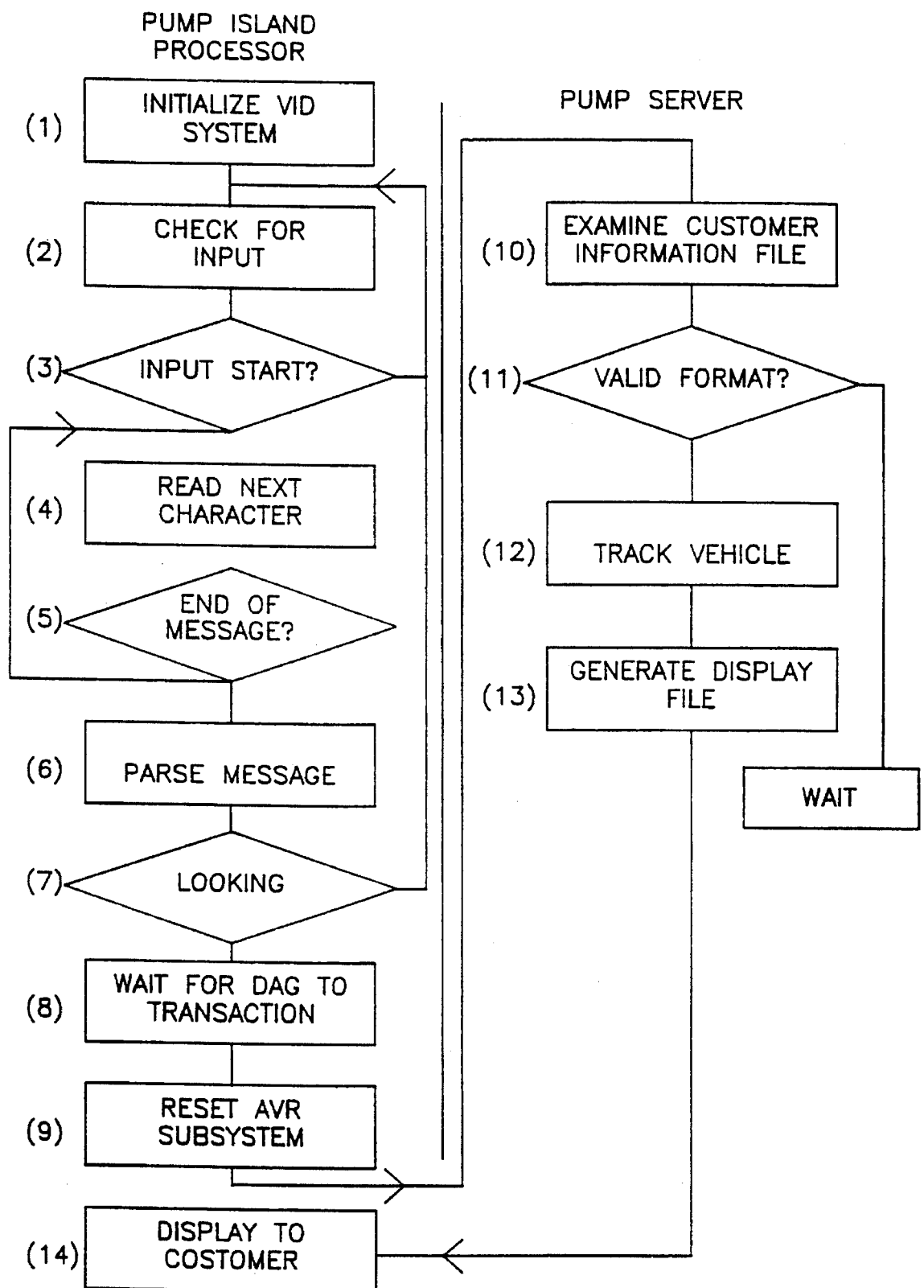
FIG. 3e shows a flow diagram of the customer recognition and display tasks at the service positions.

FIG. 3e describes the tasks performed by Boxes (3) and (4) in FIG. 1b. FIG. 3e shows a flowchart of the method used to perform the preferred embodiment in the area where the vehicle is fueled, or the customer is provided with some other service. In this embodiment, some functions are performed by the Pump Island Processor, shown as (4) in FIG. 1b, and some by the Pump Server, shown as (3) in FIG. 1b. The method starts with an initialization of the controller (1), in which the vehicle identification system is powered, cleared of any fault, and readied for activation. The pump island processor then checks its input buffer for input (2). If there is no input buffer activity, the pump island processor keeps checking the buffer at regular intervals (3). If there is input in the buffer, the pump island processor reads the contents, character by character (4), until the end of message (5). Once the entire message has been read, it is parsed (6). If the message indicates that the controller is looking (7) for a transponder, the pump island processor returns to the start of step (2). If the message is any other sequence of characters, a transaction file is created (8) which includes the location of the vehicle, the vehicle identification character sequence. The pump island processor then resets the controller (9) and returns to step (2). The pump server processor then examines the customer information file (10) to determine the customer name and other information associated with that vehicle identification sequence. If no associated information is found, this processor waits for another transaction file. If associated information is found, the pump server processor waits a period of time to see if another transaction file is created with a redundant vehicle identification sequence. In this manner the vehicle is tracked from one service area to another. If the pump server detects the presence of a file that contains a different location, and the same vehicle identification sequence within the time period, the processor waits for the duration of the time period again (12). If there is no other transaction file written containing the same vehicle identification sequence during the time period, the pump server writes a display information file (13) that contains the vehicle identification sequence, the result of the vehicle diagnostic tests, the date and time. The pump island processor periodically checks to see if a new display information file has been generated. If one has been created, the pump island processor formats the data contained in the display information file, and then displays the formatted information as a sequence of graphics and text screens to the customer. When finished, it waits for a new display information file.

Figure 4:
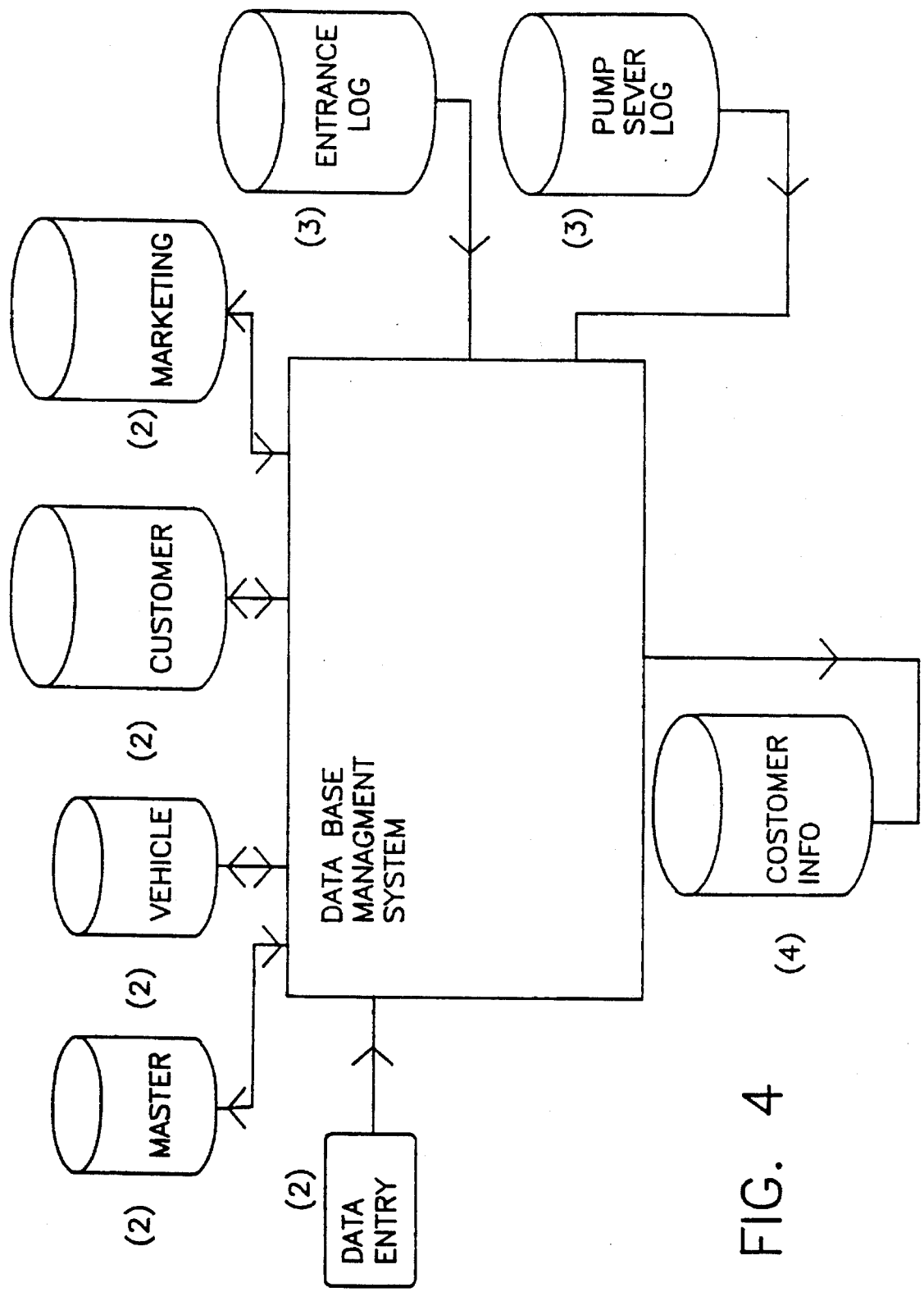
FIG. 4 shows a flow diagram of the database.

FIG. 4 shows a flowchart of the customer database. Personal information about the customer, vehicle and display format preferences is entered into the database via a data entry form (1). Such information may include recording the number of previous visits to the establishment, in order to provide promotional awards such as price discounts to frequent customers. The information is communicated to the database management system via the computer network. The entered data is maintained in separate internal database files, and all files are indexed by the vehicle identification sequence (2). Log files generated by the entrance server processor and the pump server are read and integrated into the database (3). Whenever a database entry is made, a new customer information file (4) is made. This file is then transferred to the pump server processor and is used to validate vehicle identification sequence numbers provided by the pump island processors and the entrance server.

What is claimed is:

1. A service station method for recognizing a vehicle and displaying remotely taken diagnostic information comprising:
    (a) recognizing a vehicle that enters said service station;
    (b) making a diagnostic measurement of said vehicle;
    (c) associating said diagnostic measurement with said recognized vehicle;
    (d) re-recognizing said vehicle as it moves to and stops at a service area, which is at a different position from where said diagnostic measurement is made, of said service station;
    (e) associating said diagnostic measurement with said re-recognized vehicle; and
    (f) presenting said diagnostic measurement at said service area in view of said vehicle.

2. The method of claim 1 further comprising the step of tracking said vehicle from service area to service area.

3. The method of claim 1 wherein said step for recognizing said vehicle of step (a) and step of re-recognizing said vehicle of step of (d) includes one or more antennas and one controller at each of the service areas and the diagnostic area.

4. The method of claim 3 wherein said step (a) and step (d) includes one controller for all service areas and diagnostic area.

5. The method of claim 1 wherein said diagnostic measurement is tire pressure.

6. The method of claim 1 further comprising the step of associating and displaying personalized information to the driver of said vehicle.

7. The method of claim 6 wherein said information includes personal names.

8. The method of claim 2 wherein said tracking step is performed by monitoring said vehicle's identification at positions of the pumps and determining where said vehicle comes to a stop.

9. The method of claim 1 wherein said step for displaying includes a video display tube.

10. The method of claim 1 wherein said step for displaying includes a video projection system.

11. A service station system for recognizing a vehicle and displaying remotely taken diagnostic information comprising:
    (a) means for recognizing a vehicle that enters said service station;
    (b) means for making a diagnostic measurement of said vehicle;
    (c) means for associating said diagnostic measurement with said recognized vehicle;
    (d) means for re-recognizing said vehicle as it moves to and stops at a service area, which is at a different position from where said diagnostic measurement is made, of said service station;
    (e) means for associating said diagnostic measurement with said re-recognized vehicle; and
    (f) means for presenting said diagnostic measurement at said service area in view of said vehicle.

12. The system of claim 11 further comprising the step of tracking said vehicle from service area to service area.

13. The system of claim 11 wherein said means for recognizing said vehicle of step (a) and means for re-recognizing said vehicle of step (d) includes one or more antennas and one controller at each of the service areas and the diagnostic area.

14. The system of claim 13 wherein said means of step (a) and step (d) includes one controller for all services areas and diagnostic area.

15. The system of claim 11 wherein said diagnostic measurement is tire pressure.

16. The system of claim 11 further comprising a means for associating and displaying personalized information for the driver of said vehicle.

17. The system of claim 16 wherein said information includes personal names.

18. The system of claim 12 wherein said vehicles is tracked by monitoring said vehicle's identification at pump positions and determining where said vehicle comes to a stop.

19. The system of claim 11 wherein said means for displaying includes a video display tube.

20. The system of claim 11 wherein said means for displaying includes a video projection system.

* * * * *